(12) United States Patent
Hayashida et al.

(10) Patent No.: US 10,950,852 B2
(45) Date of Patent: Mar. 16, 2021

(54) NEGATIVE ELECTRODE MATERIAL FOR NON-AQUEOUS ELECTROLYTE SECONDARY BATTERY AND NON-AQUEOUS ELECTROLYTE SECONDARY BATTERY

(71) Applicant: Panasonic Intellectual Property Management Co., Ltd., Osaka (JP)

(72) Inventors: Kazuro Hayashida, Osaka (JP); Daisuke Katou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/497,629

(22) PCT Filed: Feb. 16, 2018

(86) PCT No.: PCT/JP2018/005428
§ 371 (c)(1),
(2) Date: Sep. 25, 2019

(87) PCT Pub. No.: WO2018/179970
PCT Pub. Date: Oct. 4, 2018

(65) Prior Publication Data
US 2020/0035999 A1 Jan. 30, 2020

(30) Foreign Application Priority Data
Mar. 29, 2017 (JP) .................................. 2017-066341

(51) Int. Cl.
*H01M 4/36* (2006.01)
*H01M 4/38* (2006.01)
(Continued)

(52) U.S. Cl.
CPC ........... *H01M 4/364* (2013.01); *H01M 4/386* (2013.01); *H01M 4/5825* (2013.01); *H01M 2004/027* (2013.01)

(58) Field of Classification Search
CPC ....... H01M 10/0525; H01M 2004/027; H01M 4/364; H01M 4/386; H01M 4/5825
See application file for complete search history.

(56) References Cited

U.S. PATENT DOCUMENTS

2014/0170494 A1 6/2014 Paulsen et al.
2017/0309950 A1 10/2017 Minami et al.

FOREIGN PATENT DOCUMENTS

JP 2012-204266 A 10/2012
JP 2014-513392 A 5/2014
(Continued)

OTHER PUBLICATIONS

International Search Report dated May 22, 2018, issued in counterpart application No. PCT/JP2018/005428, with English translation. (4 pages).

*Primary Examiner* — Carlos Barcena
(74) *Attorney, Agent, or Firm* — Westerman, Hattori, Daniels & Adrian, LLP (57) ABSTRACT

A negative electrode material for a non-aqueous electrolyte secondary battery includes: a lithium silicate phase including lithium silicate particles; silicon particles dispersed in the lithium silicate phase; and a low-melting point inorganic oxide that has a lower melting point than lithium silicate forming the lithium silicate particles, and that is solid at room temperature. The lithium silicate particles and the silicon particles form a particle agglomerate, and the low-melting point inorganic oxide is filled in at least a portion of voids included in the particle agglomerate.

7 Claims, 3 Drawing Sheets (51) Int. Cl.
*H01M 4/58* (2010.01)
*H01M 4/02* (2006.01)

(56) References Cited

FOREIGN PATENT DOCUMENTS

| | | |
|---|---|---|
| JP | 2014-107013 A | 6/2014 |
| JP | 2014-199753 A | 10/2014 |
| JP | 2017-188344 A | 10/2017 |
| WO | 2016/136180 A1 | 9/2016 |
| WO | 2017/217077 A1 | 12/2017 |

NEGATIVE ELECTRODE MATERIAL FOR NON-AQUEOUS ELECTROLYTE SECONDARY BATTERY AND NON-AQUEOUS ELECTROLYTE SECONDARY BATTERY

TECHNICAL FIELD

The present invention relates mainly to an improvement of a negative electrode of a non-aqueous electrolyte secondary battery.

BACKGROUND ART

Non-aqueous electrolyte secondary batteries, in particular, lithium ion secondary batteries have a high voltage and a high energy density, and thus are attracting attention as the power sources for compact consumer devices, power storage apparatuses, and electric vehicles. With an increasing need for higher energy density for the batteries, materials containing silicon, which can form an alloy with lithium, are expected to be used as negative electrode active materials having a high theoretical capacity density.

PTL 1 proposes improving the cycle characteristics of a non-aqueous electrolyte secondary battery by dispersing a lithium compound and a metal compound other than a silicon oxide in a lithium silicate phase in a negative electrode active material including a lithium silicate phase represented by $Li_{2z}SiO_{2+z}(0<z<2)$, and silicon particles dispersed in the lithium silicate phase.

A lithium silicate has a smaller number of sites that can react with lithium, as compared with SiOx, which is a composite of $SiO_2$ and fine silicon, and thus is less prone to cause an irreversible capacity due to charge/discharge. In the case of dispersing silicon particles in a lithium silicate phase, an excellent charging/discharging efficiency can be achieved at the initial period of charge/discharge.

Note that $SiO_x$ is a composite of $SiO_2$ and fine silicon having a crystallite size of about 5 nm, and contains a large amount of $SiO_2$. Accordingly, for example, the following reaction occurs during charge/discharge.

$$SiO_x(2Si+2SiO_2)+16Li^++16e^- \rightarrow 3Li_4Si+Li_4SiO_4 \quad (1)$$

Resolving the formula (1) for Si and $2SiO_2$ results in the following formulas:

$$Si+4Li^++4e^- \rightarrow Li_4Si \quad (2)$$

$$2SiO_2+8Li^++8e^- \rightarrow Li_4Si+Li_4SiO_4 \quad (3)$$

The reaction of $SiO_2$ in the formula (3) is an irreversible reaction, and the production of $Li_4SiO_4$ can be a main cause of a reduced initial charging/discharging efficiency.

PTL 2 teaches that, as the raw materials of a silicon oxide having a continuous lithium silicate phase, it is possible to use, in addition to the lithium raw material and the silicon oxide raw material, sodium oxide, potassium oxide, rubidium oxide, cesium oxide, diphosphorus pentaoxide, titanium dioxide, aluminum oxide, zirconium oxide, lead oxide, magnesium oxide, boron oxide, and the like. The raw materials are mixed at a composition ratio at which a spinodal separate phase is formed, heated to a temperature greater than or equal to a temperature at which the raw materials change into a liquid phase, quenched to a temperature lower than a temperature at which spinodal decomposition occurs, and heated in a temperature range in which a spinodal separate phase is formed.

CITATION LIST

Patent Literatures

[PTL 1] WO 2016/136180
[PTL 2] Japanese Laid-Open Patent Publication No. 2014-199753

SUMMARY OF INVENTION

In the case of dispersing silicon particles in a matrix (hereinafter also referred to as "lithium silicate phase") formed by lithium silicate particles, a stress caused by the expansion and contraction of the silicon particles during charge/discharge is reduced by the lithium silicate phase. Cracking may occur in the lithium silicate phase due to a stress received by the lithium silicate phase at this time. The occurrence of cracking in the lithium silicate phase reduces the current collecting efficiency of the negative electrode, and promotes a side reaction, thus reducing the cycle characteristics.

In view of the foregoing, a negative electrode material for a non-aqueous electrolyte secondary battery according to an aspect of the present disclosure includes: a lithium silicate phase including lithium silicate particles; silicon particles dispersed in the lithium silicate phase; and a low-melting point inorganic oxide that has a lower melting point than lithium silicate forming the lithium silicate particles, and that is solid at room temperature. The lithium silicate particles and the silicon particles form a particle agglomerate, and the low-melting point inorganic oxide is filled in at least a portion of voids included in the particle agglomerate.

Another aspect of the present disclosure relates to a non-aqueous electrolyte secondary battery including: a negative electrode including the above-described negative electrode material for a non-aqueous electrolyte secondary battery; a positive electrode capable of electrochemically absorbing and desorbing lithium; and a non-aqueous electrolyte.

With the negative electrode material for a non-aqueous electrolyte secondary battery according to the present disclosure, the low-melting point inorganic oxide is filled in at least a portion of the voids included in the particle agglomerate. Accordingly, the voids of the negative electrode material are decreased, and the lithium silicate phase is densified, resulting in an increase in the strength of the particle agglomerate. Consequently, the cracking of the lithium silicate phase is suppressed, thus making it possible to suppress the reduction in the cycle characteristics.

DESCRIPTION OF EMBODIMENT

A negative electrode material for a non-aqueous electrolyte secondary battery (hereinafter also referred to as "negative electrode material LSX") according to an embodiment of the present invention includes a lithium silicate phase including lithium silicate particles, silicon particles dispersed in the lithium silicate phase, a low-melting point inorganic oxide that has a lower melting point than lithium silicate forming the lithium silicate particles, and that is solid at room temperature. The lithium silicate particles and the silicon particles form a particle agglomerate. That is, the silicon particles are dispersed in a matrix (lithium silicate phase) formed by the lithium silicate particles agglomerating together. The particle agglomerate may be a secondary particle in which a plurality of primary particles including the lithium silicate phase and the silicon particles dispersed in the lithium silicate phase are agglomerated.

The low-melting point inorganic oxide is filled in at least a portion of the voids included in the particle agglomerate. For example, the low-melting point inorganic oxide may be present or localized in an interface between the adjacent primary particles inside the particle agglomerate or the secondary particle. As a result of the low-melting point inorganic oxide being filled in at least a portion of the voids, or being interposed between the primary particles, the lithium silicate phase is densified, resulting in an increase in the strength of the particle agglomerate. It is believed that the low-melting point inorganic oxide has the function of a binder for firmly bonding together the lithium silicate particles or the primary particles.

The low-melting point inorganic oxide may be an oxide that has a lower melting point than lithium silicate, and that is solid at room temperature. Since the melting point of lithium silicate is generally 1050° C., the melting point of the low-melting point inorganic oxide may be less than 1050° C., preferably 1000° C. or less, more preferably 900° C. or less. However, from the viewpoint of obtaining a highly stable negative electrode material LSX, an oxide having a melting point of 100° C. or more is preferable.

Preferably, the low-melting point inorganic oxide is a glassy oxide. The glassy oxide can be easily filled in conformity with the shape of the voids included in the particle agglomerate. The glassy oxide filled in the voids tends to be firmly bonded to the surface of the lithium silicate.

The low-melting point inorganic oxide may include any of a metal element, a base metal element, and a nonmetal element as a central element (cationic element) so long as it has the above-described melting point. Among these, the low-melting point inorganic oxide preferably includes at least one element selected from the group consisting of B and P, more preferably includes at least B. The reason is that boron (B) has high affinity for lithium silicate. The low-melting point inorganic oxide may also be a composite oxide. The content of the above-described element (B and/or P) in the elements other than oxygen in the low-melting point inorganic oxide is preferably 50 mol % or more, more preferably 80 mol % or more, further preferably 95 mol % or more.

When the low-melting point oxide includes boron (B), the B content in the elements other than oxygen in the low-melting point oxide is preferably 50 mol % or more, more preferably 80 mol % or more, further preferably 95 mol % or more. Boron may form, together with lithium silicate, for example, a borosilicate glass or a material similar thereto.

Preferably, at least a portion (e.g., 50 mol % or more) of the boron included in the low-melting point inorganic oxide is boron having a tetracoordinated structure. Although the reason is unclear, it is believed that the coordination number of boron changes to tetracoordination as a result of the boron oxide and the surface of the lithium silicate particles being firmly bonded together. It is more preferable that 80 mol % or more of the boron included in the low-melting point inorganic oxide has a tetracoordinated structure, and it is further preferable that substantially no boron having a tricoordinated structure is detected. Note that the coordinated structure of boron can be measured with an analyzer using nuclear magnetic resonance (NMR). The molar ratio of boron having each of the coordinated structures can be calculated from the integrated value of peaks of an NMR spectrum.

Since many of the voids of the negative electrode material LSX are formed between the primary particles or between the lithium silicate particles, the low-melting point inorganic oxide is interposed mainly between the primary particles or between the lithium silicate particles. The low-melting point inorganic oxide may be present along the grain boundaries between the lithium silicate particles forming the lithium silicate phase or along the interface between the adjacent primary particles so as to cover at least a portion of the surface of the lithium silicate particles. Alternatively, the low-melting point inorganic oxide may be interposed between the lithium silicate phase and the silicon particles, and may coat at least a portion of the surface of the particle agglomerate or the secondary particle formed by the lithium silicate particles and the silicon particles.

Most of the low-melting point inorganic oxide is localized in the vicinity of the surface of the lithium silicate particles or between the primary particles, without being dissolved into the lithium silicate particles. The distribution state of the low-melting point inorganic oxide in the negative electrode material LSX can be confirmed, for example, by X-ray photoelectron spectroscopy (XPS).

The amount of the low-melting point inorganic oxide is preferably 1 mass % or more and 10 mass % or less, more preferably 3 mass % or more and 8 mass % or less, relative to the total amount of the lithium silicate particles, the silicon particles, and the low-melting point inorganic oxide. When the amount of the low-melting point inorganic oxide is 3 mass % or more, this is sufficient to thinly bond the lithium silicate particles together, so that a significant effect in improving the cycle characteristics can be expected. On the other hand, by setting the amount of the low-melting point inorganic oxide to 8 mass % or less, the reduction in the initial capacity can be minimized.

The amount of the low-melting point inorganic oxide can be determined using, as an index, an amount calculated assuming that the central element forms a stoichiometric oxide, regardless of the state of the central element. For example, when the central element is B, the $B_2O_3$ amount calculated assuming that all of the B forms $B_2O_3$ is preferably within the above-described range.

The amount of the low-melting point inorganic oxide is calculated from the content of the central element. The content of the central element can be analyzed by inductively coupled plasma emission spectrometry (ICP-AES). Specifically, the content of the central element is measured by entirely dissolving the sample in hot hydrofluoric-nitric acid (heated acid mixture of hydrofluoric acid and nitric acid), and removing the carbon in the dissolution residue by filtration, followed by analyzing the resulting filtrate by ICP-AES. For example, when the central element is boron, a calibration curve is formed using a commercially available standard solution of B, and the B content of the sample is calculated.

The crystallite size of the silicon particles dispersed in the lithium silicate phase is, for example, 10 nm or more. The silicon particles have a particulate phase of a simple substance of silicon (Si). When the crystallite size of the silicon particles is 10 nm or more, the surface area of the silicon particles can be kept small, and therefore the degradation of the silicon particles, which is accompanied by the generation of an irreversible capacity, is less likely to occur. The crystallite size of the silicon particles is calculated from the half-width of a diffraction peak attributed to the Si (111) plane in an X-ray diffraction (XRD) pattern of the silicon particles, using the Scherrer equation.

From the viewpoint of suppressing the cracking of the silicon particles, the silicon particles have an average particle size of preferably 500 nm or less, more preferably 200 nm or less, and further preferably 50 nm or less, before initial charging. After initial charging, the silicon particles have an average particle size of preferably 400 nm or less, more preferably 100 nm or less. By refining the silicon particles, the volume change during charge/discharge is reduced, and the structural stability of the negative electrode material LSX is further improved.

The average particle size of the silicon particles is measured by observing a cross-sectional SEM (Scanning Electron Microscope) photograph of the negative electrode material LSX. Specifically, the average particle size of the silicon particles is determined by averaging the maximum diameters of arbitrarily selected 100 silicon particles. The silicon particles are formed by a plurality of crystallites gathering together.

From the viewpoint of increasing the capacity and improving the cycle characteristics, the content, as measured by Si-NMR, of the silicon particles (simple substance of Si) in the negative electrode material LSX is preferably 20 mass % to 95 mass %, more preferably 35 mass % to 75 mass %. In this case, the diffusion of lithium ion becomes favorable, making it possible to easily achieve excellent load characteristics. In addition, the surface of the silicon particles that is exposed without being covered by the lithium silicate phase is reduced, suppressing a side reaction between the non-aqueous electrolyte and the silicon particles.

Note that the larger the content of the silicon particles (simple substance of Si) in the negative electrode material LSX, the more difficult it is to densely form the negative electrode material LSX, and the number of voids of the particle agglomerate formed by the lithium silicate particles and the silicon particles tends to increase. The larger the number of the voids, the lower the strength of the particle agglomerate or the negative electrode material LSX tends to be, and also the lower the conductivity of the negative electrode material LSX tends to be. Therefore, the larger the content of the silicon particles (simple substance of Si), the more significant the effect achieved by filling the low-melting point inorganic oxide in the voids is.

In the following, desirable measurement conditions for Si-NMR will be described.

Measurement apparatus: a solid-state nuclear magnetic resonance spectrometer (INOVA-400), manufactured by Varian Inc.
Probe: Varian 7 mm CPMAS-2
MAS: 4.2 kHz
MAS rate: 4 kHz
Pulse: DD (45° pulse+signal acquisition time 1H decoupling)
Repetition time: 1200 sec
Observation width: 100 kHz
Center of observation: approximately −100 ppm
Signal acquisition time: 0.05 sec
Number of times of integrations: 560
Sample amount: 207.6 mg When the composition of the lithium silicate is represented by the formula: $Li_{2z}SiO_{2+z}$, it is preferable that $0<z<2$ is satisfied. The formula: $Li_{2z}SiO_{2+z}$ can also be represented as $Li_{2z}SiO_2 \cdot O_z$ or $(Li_2O)_z \cdot SiO_2$, and it can be considered that z mol of the $Li_2O$ component (alkali component) is contained per mol of the $SiO_2$ component. The smaller the ratio of the $Li_2O$ component, the more the dissolution of the alkali component can be suppressed, and the more the stability of the negative electrode material LSX can be improved. It is preferable that the above formula satisfies $0<z<1$.

For example, preferably 50 mass % or more, more preferably 60 mass % or more of the lithium silicate phase is constituted by lithium silicate that satisfies $0<z \leq \frac{1}{2}$. In this case, the contents of $Li_4SiO_4$ ($z=2$) and $Li_2SiO_3$ ($z=1$), which are prone to cause dissolution of an alkali component that may be contained in the lithium silicate phase, are reduced. The content of $Li_2Si_2O_5$ in the lithium silicate phase, as measured by Si-NMR, is preferably greater than 15 mass %, more preferably 40 mass % or more.

The composition of the lithium silicate phase can be analyzed in the following manner.

First, the mass of a sample of the negative electrode material LSX is measured. Thereafter, the contents of carbon, lithium, and oxygen that are contained in the sample are calculated in the following manner. Next, the carbon content is subtracted from the mass of the sample, the lithium content and the oxygen content in the remaining amount are calculated, and the x value is determined from the molar ratio of lithium (Li) and oxygen (O).

The carbon content is measured using a carbon-sulfur analyzer (e.g., EMIA-520 manufactured by HORIBA, Ltd.). A measured amount of the sample is placed on a magnetic board, to which a combustion assistant is then added, and the magnetic board is inserted in a combustion furnace (carrier gas: oxygen) heated to 1350° C., and the amount of the carbon dioxide gas generated during combustion is detected by infrared absorption. A calibration curve is formed using, for example, carbon steel (carbon content: 0.49%) manufactured by Bureau of Analysed Sampe. Ltd., and the carbon content of the sample is calculated (high-frequency induction heating furnace combustion-infrared absorption method).

The oxygen content is measured using an oxygen-nitrogen-hydrogen analyzer (e.g., EGMA-830 manufactured by HORIBA, Ltd.). The sample is placed in a Ni capsule, which is then introduced, together with a Sn pellet and a Ni pellet that will form flux, into a carbon crucible heated with a power of 5.75 kW, and the carbon monoxide gas released is detected. A calibration curve is formed using a standard sample $Y_2O_3$, and the oxygen content of the sample is calculated (inert gas fusion-nondispersive infrared absorption method).

The lithium content is measured by entirely dissolving the sample in hot hydrofluoric-nitric acid (heated acid mixture of hydrofluoric acid and nitric acid), and removing the carbon in the dissolution residue by filtration, followed by analyzing the resulting filtrate by inductively coupled plasma emission spectrometry (ICP-AES). A calibration curve is formed using a commercially available standard solution of lithium, and the lithium content of the sample is calculated.

It is preferable that the negative electrode material LSX forms a particulate material (also referred to as "LSX particles") having an average particle size of 1 to 25 μm, more preferably 4 to 15 μm. With the above-described range, the stress caused by a volume change of the negative electrode material LSX with charge/discharge can be more easily reduced, thus making it possible to easily achieve good cycle characteristics. The LSX particles also have an appropriate surface area, so that the capacity decrease caused by a side reaction with the non-aqueous electrolyte is also suppressed.

The average particle size of the LSX particles means a particle size (volume average particle size) with which an accumulated volume value is 50% in a particle size distribution measured by the laser diffraction/scattering method. As the measurement apparatus, it is possible to use, for example, an "LA-750" manufactured by HORIBA, Ltd. (HORIBA).

Preferably, the LSX particles include a conductive material that coats at least a portion of the surfaces thereof. Due to the poor electronic conductivity of the lithium silicate phase, the conductivity of the LSX particles also tend to be low. The conductivity can be dramatically increased by coating the surfaces of the LSX particles with the conductive material. Preferably, the conductive layer has a thickness small enough not to substantially affect the average particle size of the LSX particles.

Next, a method for manufacturing the negative electrode material LSX will be described in detail.

Generally, the negative electrode material LSX is synthesized through two processes, namely, a pre-process of obtaining lithium silicate, and a post-process of obtaining a negative electrode material LSX from lithium silicate and a raw material silicon. The low-melting point inorganic oxide that has a lower melting point than lithium silicate, and that is solid at room temperature is added in the post-process.

In the pre-process, for example, silicon dioxide and a lithium compound are mixed, and the resulting mixture is fired, to synthesize lithium silicate. In the case of synthesizing the lithium silicate represented by the formula: $Li_{2z}SiO_{2+z}$, the z value may be controlled using the atomic ratio: Li/Si of lithium to silicon in the mixture of silicon dioxide and a lithium compound. To synthesize good lithium silicate that causes less dissolution of the alkali component, Li/Si is preferably smaller than 1.

Lithium carbonate, lithium oxide, lithium hydroxide, lithium hydride, and the like can be used as the lithium compound. These may be used alone or in a combination of two or more.

It is preferable that the mixture including silicon dioxide and the lithium compound is heated in the air to 400° C. to 1200° C., preferably 800° C. to 1100° C., thus reacting the silicon dioxide with the lithium compound.

The post-process includes the steps of (i) applying a shearing force to a first mixture including lithium silicate and a raw material silicon, to prepare a composite of lithium silicate particles and silicon particles; (ii) preparing a second mixture including the composite and a low-melting point inorganic oxide; and (iii) firing the second mixture in an inert atmosphere while applying a pressure thereto, to produce a particle agglomerate in which the lithium silicate particles and the silicon particles are agglomerated, and to fill the low-melting point inorganic oxide in at least a portion of voids included in the particle agglomerate, thus obtaining a negative electrode material LSX.

In step (i), silicon coarse particles having an average particle size of several micrometers to several tens of micrometers may be used as the raw material silicon. By grinding the coarse particles of lithium silicate and the raw material silicon while stirring the first mixture, a composite of fine lithium silicate particles and fine silicon particles can be obtained. The first mixture may be stirred while being pulverized using, for example, a grinding apparatus such as a ball mill. However, the process of obtaining the composite is not limited thereto.

In step (ii), the second mixture may be prepared by appropriately mixing the composite of the lithium silicate particles and the silicon particles with a low-melting point inorganic oxide. The low-melting point inorganic oxide is melted by the subsequent firing, and therefore does not need to be excessively ground. As previously described, it is preferable that at least one oxide selected from the group consisting of B and P is used as the low-melting point inorganic oxide. Specifically, $B_2O_3$, $P_2O_5$ or the like having a melting point of less than 500° C. may be added to the composite. These may be used alone or in a combination of two or more.

In step (iii), the second mixture is sandwiched between plates made of a material such as stainless steel that can easily conduct heat and withstand heat of 1000° C. or more, and the whole is heated at a temperature of, for example, 500° C. to 900° C., so that the mixture is fired. At this time, the agglomeration of the lithium silicate particles and the silicon particles is promoted by firing the second mixture while applying a pressure thereto, for example, by hot pressing. When the second mixture is heated at a temperature higher than the melting point of the low-melting point inorganic oxide, the molten low-melting point inorganic oxide is filled in the voids between the particles, so that a denser negative electrode material LSX can be produced. At this time, the low-melting point inorganic oxide may react with the surface of the lithium silicate particles, and change its properties.

The obtained negative electrode material LSX is a sintered body, and thus may be ground into a particulate, to form LSX particles. At this time, by appropriately selecting the grinding conditions, it is possible to obtain LSX particles having an average particle size of 1 to 25 μm, for example.

Next, at least a portion of the surface of the LSX particles may be coated with a conductive material, to form a conductive layer. The conductive material is preferably electrochemically stable, and a carbon material is preferable. Examples of the method for coating the surface of the particulate material with a carbon material include the CVD method using a hydrocarbon gas such as acetylene or methane as the raw material, and a method involving mixing coal pitch, petroleum pitch, a phenol resin, or the like with the particulate material, and carbonizing the mixture by heating. Alternatively, carbon black may be attached to the surface of the particulate material.

In consideration of the securing of conductivity and the lithium ion diffusion, the thickness of the conductive layer is preferably 1 to 200 nm, more preferably 5 to 100 nm. The thickness of the conductive layer can be measured by observing a cross section of the particles using SEM or TEM.

Further, the process of washing the LSX particles with acid may be performed. For example, by washing the LSX particles with an acidic aqueous solution, a trace amount of a component, such as $Li_2SiO_3$, that can be produced when preparing a composite of the raw material silicon and lithium silicate, can be dissolved and removed. As the acidic aqueous solution, it is possible to use an aqueous solution of an inorganic acid such as hydrochloric acid, hydrofluoric acid, sulfuric acid, nitric acid, phosphoric acid, and carbonic acid, or an aqueous solution of an organic acid such as citric acid and acetic acid.

Figure 1:
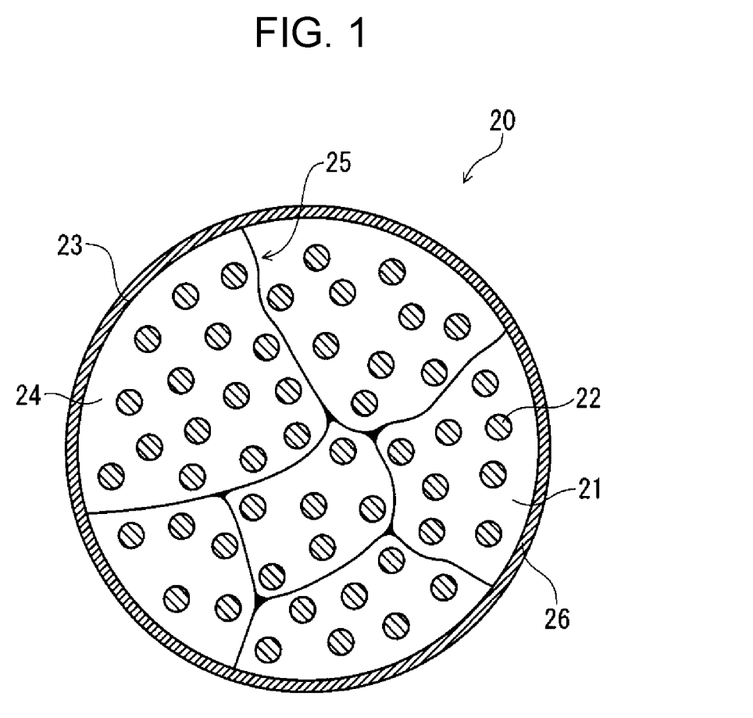
FIG. 1 is a schematic cross-sectional view showing the configuration of an LSX particle according to an embodiment of the present invention.

FIG. 1 schematically shows a cross section of an LSX particle 20 as an example of the negative electrode material LSX. The LXS particle 20 includes a base particle 23 constituted by a secondary particle in which a plurality of primary particles 24 are agglomerated. Each primary particle 24 includes a lithium silicate phase 21 and silicon particles 22 dispersed in the lithium silicate phase 21. A low-melting point inorganic oxide 25 is present or localized in at least a portion of the interface between the adjacent primary particles 24 inside the base particle 23.

As shown in FIG. 1, it is preferable that the LSX particle 20 further includes a conductive layer 26 that coats at least a portion of the surface of the base particle 23. The conductive layer 26 is formed of a conductive material. The primary particles 24 forming the base particle 23 or the secondary particle have an island-in-the-sea structure, for example. On a given cross section of a primary particle 24, fine silicon particles 22 are substantially uniformly scattered, without being localized in a partial region of the lithium silicate phase 21.

Preferably, both the lithium silicate phase 21 and the silicon particles 22 are composed of a group of fine particles. The lithium silicate phase 21 is composed of lithium silicate particles even finer than the silicon particles 22. In this case, in an X-ray diffraction (XRD) pattern of the negative electrode material LSX 20, the diffraction peak intensity attributed to the (111) plane of the simple substance of Si is larger than the diffraction peak intensity attributed to the (111) plane of the lithium silicate.

The average particle size of the primary particles 24 is preferably 1 to 20 μm, more preferably 4 to 14 μm. This makes it possible to more easily reduce the stress caused by a volume change of the negative electrode material due to charge/discharge, so that good cycle characteristics can easily be obtained. In addition, the composite particles have an appropriate surface area, so that the capacity decrease due to a side reaction with the non-aqueous electrolyte is also suppressed.

Note that the average particle size of the primary particles 24 is determined by averaging the diameters of equivalent circles of the cross-sectional areas (circles having the same area as the cross-sectional area of the primary particles) of arbitrary 100 primary particles observed in a cross-sectional SEM photograph of the negative electrode material LSX.

Note that $SiO_2$ in an amount corresponding to that of a natural oxide film may be present on the surface of the silicon particles. Note, however, that the $SiO_2$ content in the base particle 23, as measured by Si-NMR, is preferably 30 mass % or less, more preferably 7 mass % or less, for example. It is preferable that substantially no peak of $SiO_2$ is observed at 2θ=25° in an XRD pattern obtained by XRD measurement.

Next, a non-aqueous electrolyte secondary battery according to an embodiment of the present invention will be described in detail. The non-aqueous electrolyte secondary battery includes, for example, a negative electrode, a positive electrode, and a non-aqueous electrolyte as described below.

[Negative Electrode]

The negative electrode includes, for example, a negative electrode current collector, and a negative electrode material mixture layer that is formed on the surface of the negative electrode current collector, and that includes a negative electrode active material. The negative electrode material mixture layer can be formed by applying, to the surface of the negative electrode current collector, a negative electrode slurry in which the negative electrode material mixture is dispersed in a dispersing medium, and drying the slurry. The coating film obtained after drying may be optionally rolled. The negative electrode material mixture layer may be formed on one surface of the negative electrode current collector, or may be formed on both surfaces thereof.

The negative electrode material mixture includes, as the negative electrode active material, a negative electrode material LSX (or LSX particles) as an essential component, and may include a binder, a conductive agent, a thickener, and the like as optional components. The silicon particles in the negative electrode material LSX can absorb a large amount of lithium ions, and thus contribute to an increase in the capacity of the negative electrode.

Preferably, the negative electrode active material further includes a carbon material that electrochemically absorbs and desorbs lithium ion. The negative electrode material LSX undergoes volume expansion and contraction due to charge/discharge, and, therefore, when the ratio thereof in the negative electrode active material increases, a contact failure between the negative electrode active material and the negative electrode current collector is likely to occur due to charge/discharge. On the other hand, by using the negative electrode material LSX and the carbon material in combination, it is possible to achieve excellent cycle characteristics, while providing the negative electrode with the high capacity of the silicon particles. The ratio of the negative electrode material LSX to the total amount of the negative electrode material LSX and the carbon material is preferably 3 to 30 mass %, for example. This makes it even easier to achieve both a high capacity and an improvement in cycle characteristics.

Examples of the carbon material include graphite, graphitizable carbon (soft carbon), and hardly graphitizable carbon (hard carbon). Among these, graphite is preferable because of the excellent stability of charge/discharge and the small irreversible capacity. Graphite means a material having a graphite crystal structure, and includes, for example, natural graphite, artificial graphite, and graphitized mesophase carbon particles. The carbon materials may be used alone or in a combination of two or more.

A non-porous conductive substrate (metal foil, etc.) or a porous conductive substrate (a mesh structure, a net structure, a punched sheet, etc.) is used as the negative electrode current collector. Examples of the material of the negative electrode current collector include stainless steel, nickel, a nickel alloy, copper, and a copper alloy. The thickness of the negative electrode current collector is, but is not particularly limited to, preferably 1 to 50 μm, more preferably 5 to 20 μm, in terms of the balance between the strength and the weight reduction of the negative electrode.

Examples of the binder include resin materials, including, for example, fluorocarbon resins such as polytetrafluoroethylene and polyvinylidene fluoride (PVDF); polyolefin resins such as polyethylene and polypropylene; polyamide resins such as aramid resin; polyimide resins such as polyimide and polyamide imide; acrylic resins such as polyacrylic acid, polymethyl acrylate, and ethylene-acrylic acid copolymers; vinyl resins such as polyacrylonitrile and polyvinyl acetate; polyvinyl pyrrolidone; polyether sulfone; and rubber-like materials such as styrene-butadiene copolymer rubber (SBR). These may be used alone or in a combination of two or more.

Examples of the conductive agent include carbon blacks such as acetylene black; conductive fibers such as carbon fiber and metal fiber; carbon fluoride; metal powders such as aluminum powder; conductive whiskers such as zinc oxide and potassium titanate; conductive metal oxides such as titanium oxide; and organic conductive materials such as a phenylene derivative. These may be used alone or in a combination of two or more.

Examples of the thickener include cellulose derivatives (cellulose ether, etc.), including, for example, carboxymethyl cellulose (CMC) and modified products thereof (also including salts such as a Na salt), and methylcellulose; saponified products of polymers having vinyl acetate units such as polyvinyl alcohol; and polyethers (polyalkylene oxides such as polyethylene oxide, etc.). These may be used alone or in a combination of two or more.

Examples of the dispersing medium include, but are not particularly limited to, water, alcohols such as ethanol, ethers such as tetrahydrofuran, amides such as dimethylformamide, N-methyl-2-pyrrolidone (NMP), or solvent mixtures thereof.

[Positive Electrode]

The positive electrode includes, for example, a positive electrode current collector, and a positive electrode material mixture layer that is formed on the surface of the positive electrode current collector. The positive electrode material mixture layer can be formed by applying, to the surface of the positive electrode current collector, a positive electrode slurry in which the positive electrode material mixture is dispersed in a dispersing medium, and drying the slurry. The coating film obtained after drying may be optionally rolled. The positive electrode material mixture layer may be formed on one surface of the positive electrode current collector, or may be formed on both surfaces thereof.

A lithium composite metal oxide can be used as the positive electrode active material. Examples thereof include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, $Li_2MePO_4F$ (M is at least one of Na, Mg, Sc, Y, Mn, Fe, Co, Ni, Cu, Zn, Al, Cr, Pb, Sb, and B). Here, a=0 to 1.2, b=0 to 0.9, and C=2.0 to 2.3. Note that the value a, which represents the molar ratio of lithium, is a value obtained immediately after the fabrication of the active material, and increases or decreases through charge/discharge.

As the binder and the conductive agent, the materials given as the examples for the negative electrode can be used. As the conductive agent, graphite such as natural graphite or artificial graphite may be used.

The shape and the thickness of the positive electrode current collector can be respectively selected from the shape and the range corresponding to the negative electrode current collector. Examples of the material of the positive electrode current collector include stainless steel, aluminum, an aluminum alloy, and titanium.

[Non-Aqueous Electrolyte]

The non-aqueous electrolyte includes a non-aqueous solvent, and a lithium salt dissolved in the non-aqueous solvent. The concentration of the lithium salt in the non-aqueous electrolyte is, for example, 0.5 to 2 mol/L. The non-aqueous electrolyte may contain a known additive.

As the non-aqueous solvent, it is possible to use, for example, cyclic carbonic acid ester, chain carbonic acid ester, and cyclic carboxylic acid ester. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carbonic acid ester include γ-butyrolactone (GBL) and γ-valerolactone (GVL). The non-aqueous solvents may be used alone or in a combination of two or more.

As the lithium salt, it is possible to use, for example, lithium salts of chlorine-containing acid ($LiClO_4$, $LiAlCl_4$, $LiB_{10}Cl_{10}$, etc.), lithium salts of fluorine-containing acid ($LiPF_6$, $LiBF_4$, $LiSbF_6$, $LiAsF_6$, $LiCF_3SO_3$, $LiCF_3CO_2$, etc.), lithium salts of fluorine-containing acid imide ($LiN(CF_3SO_2)_2$, $LiN(CF_3SO_2)(C_4F_9SO_2)$, $LiN(C_2F_5SO_2)_2$, etc.), and lithium halides (LiCl, LiBr, LiI, etc.). The lithium salts may be used alone or in a combination of two or more.

[Separator]

Usually, it is desirable that a separator is interposed between a positive electrode and a negative electrode. The separator has a high ion permeability, and appropriate mechanical strength and insulating properties. As the separator, it is possible to use a microporous thin film, a woven fabric, a non-woven fabric, and the like. Polyolefins such as polypropylene and polyethylene are preferable as the material of the separator.

An exemplary structure of the non-aqueous electrolyte secondary battery includes a structure in which an electrode group formed by winding a positive electrode and a negative electrode with a separator interposed therebetween, and a non-aqueous electrolyte are housed in an outer case. Alternatively, an electrode group having another configuration, such as a stacked electrode group formed by stacking a positive electrode and a negative electrode with a separator interposed therebetween, may be applied in place of the wound electrode group. For example, the non-aqueous electrolyte secondary battery may have any of a cylindrical configuration, a square configuration, a coin configuration, a button configuration, and a laminated configuration.

Figure 2:
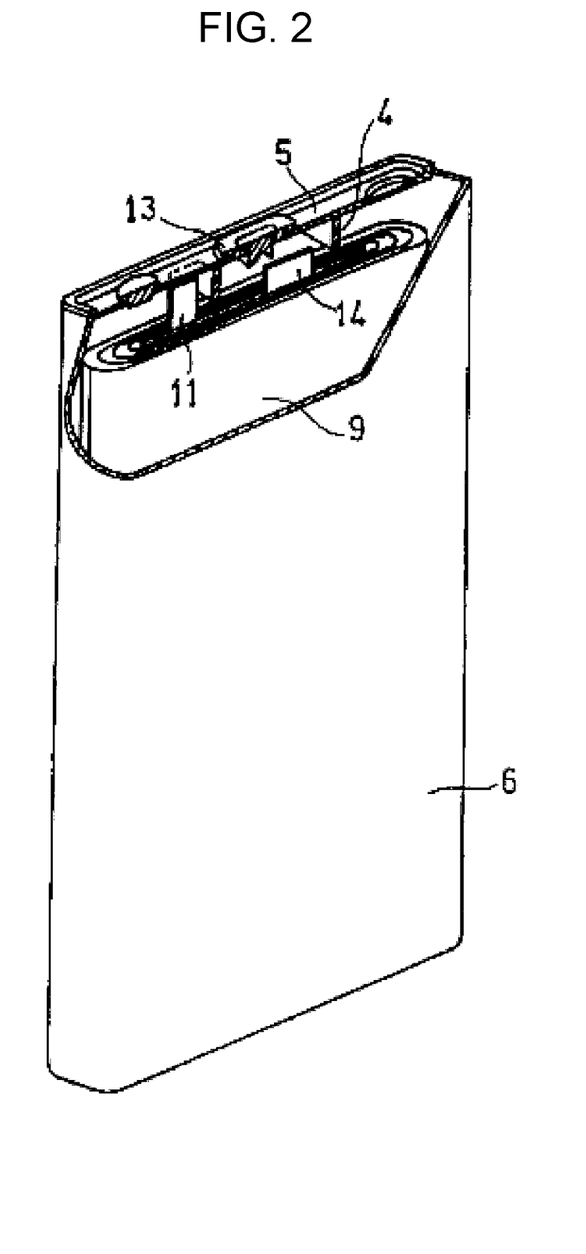
FIG. 2 is a partially cut-away schematic perspective view of a non-aqueous electrolyte secondary battery according to an embodiment of the present invention.

FIG. 2 is a partially cut-away schematic perspective view of a square non-aqueous electrolyte secondary battery according to an embodiment of the present invention.

The battery includes a square battery case 6 having a bottom, and an electrode group 9 and a non-aqueous electrolyte (not shown) that are housed in the battery case 6. The electrode group 9 includes a long ship-shaped negative electrode, a long ship-shaped positive electrode, and a separator that is interposed therebetween and prevents a direct contact therebetween. The electrode group 9 is formed by winding the negative electrode, the positive electrode, and the separator around a flat plate-shaped winding core, and pulling out the winding core.

An end of a negative electrode lead 11 is attached to a negative electrode current collector of the negative electrode through welding or the like. An end of a positive electrode lead 14 is attached to a positive electrode current collector of the positive electrode through welding or the like. The other end of the negative electrode lead 11 is electrically connected to a negative electrode terminal 13 provided on a sealing plate 5. The other end of the positive electrode lead 14 is electrically connected to the battery case 6 also serving as the positive electrode terminal. A resin frame body 4 that isolates the electrode group 9 and the sealing plate 5 from each other and also isolates the negative electrode lead 11 and the battery case 6 from each other is disposed at an upper portion of the electrode group 9. Then, an opening of the battery case 6 is sealed by the sealing plate 5.

Note that the non-aqueous electrolyte secondary battery may have a cylindrical structure, a coin-shaped structure, a button-shaped structure, or the like that includes a battery case made of metal, or may be a laminated battery including a battery case made of a laminated sheet, which is a laminate of a barrier layer and a resin.

Hereinafter, the present invention will be specifically described by way of examples and comparative examples. However, the present invention is not limited to the following examples.

Example 1

[Preparation of Negative Electrode Material LSX]
(1) Synthesis of Lithium Silicate Silicon dioxide and lithium carbonate were mixed such that the atomic ratio: Si/Li was 1.05, and the mixture was fired at 950° C. in the air for 10 hours, to obtain lithium silicate represented by the formula: $Li_2Si_2O_5$ (z=0.5). The obtained lithium silicate was ground so as to have an average particle size of 10 μm.

(2) Synthesis of Negative Electrode Material LSX
Step (i)

A first mixture including the lithium silicate ($Li_2Si_2O_5$) having an average particle size of 10 μm and the raw material silicon (3N, average particle size: 10 μm) at a mass ratio of 50:50 was prepared. The first mixture was filled in a pot (made of SUS, volume: 500 mL) of a planetary ball mill (P-5, manufactured by Fritsch Co., Ltd.), then 24 SUS balls (diameter 20 mm) were placed in the pot, and the cover was closed. Then, the mixture was ground in an inert atmosphere at 200 rpm for 50 hours, to obtain a composite of the lithium silicate particles and the silicon particles.

Step (ii)

Next, 3 parts by mass of $B_2O_3$, which is a low-melting point inorganic oxide, was added per 97 parts by mass of the composite, to prepare a second mixture. Specifically, 97 parts by mass of the composite of the lithium silicate particles and the silicon particles and 3 parts by mass of $B_2O_3$ were filled in a pot (made of alumina, volume: 45 mL) of a planetary ball mill (P-7, manufactured by Fritsch Co., Ltd.), then 180 zirconia balls (diameter: 5 mm) were placed in the pot, and the cover was closed. Then, the mixture was ground in an inert atmosphere at 200 rpm for 20 hours, to obtain a second mixture, which was a composite of the lithium silicate particles, the silicon particles, and the low-melting point inorganic oxide.

Step (iii)

The second mixture was heat-treated at a temperature of 500° C. to 900° C. while applying a pressure thereto by hot pressing, to obtain a negative electrode material LSX A1 in the thrill of a sintered body.

Thereafter, the negative electrode material LSX A1 in the form of a sintered body was ground, then passed through a mesh of 106 μm, and thereafter mixed with coal pitch (MCP 250, manufactured by JFE Chemical Corporation). Then, the mixture was fired in an inert atmosphere at 800° C. for 5 hours, and the surface of the LSX particles was coated with a conductive carbon, to form a conductive layer. The coating amount of the conductive layer was 6.25 mass %, relative to the total mass of the negative electrode material LSX A1 and the conductive layer. In this manner, LSX particles A1 including a conductive layer and having an average particle size of 10 μm were obtained.

[Analysis of LSX particles]

An XRD analysis of the LSX particles A1 indicated that the crystallite size of the silicon particles calculated from the diffraction peak attributed to the Si (111) plane using the Scherrer equation was 15 nm. As a result of analyzing the composition of the lithium silicate phase by the above-described methods (high-frequency induction heating furnace combustion-infrared absorption method, inert gas fusion-nondispersive infrared absorption method, and inductively coupled plasma emission spectrometry (ICP-AES)), the Si/Li ratio was 1.0, and the $Li_2Si_2O_5$ content measured by Si-NMR was 48 mass %.

As a result of measuring the porosity of the negative electrode material LSX in the form of a sintered body before formation of the conductive layer, the porosity was 15.2%. The specific method for measuring the porosity is as follows.

(1) A container containing liquid paraffin (020-59445, manufactured by KISHIDA CHEMICAL Co., Ltd.) was placed on a balance (HR-150AZ, manufactured by A&D Company), and an underside weighing fitting capable of weighing while being suspended from the balance was mounted to the balance. At this time, the weighing fitting was mounted such that the sample stage thereof was immersed in the paraffin.

(2) The negative electrode material LSX in the form of a sintered body was placed on the sample stage, and the weight thereof in the air and the weight thereof immediately after placement in the paraffin were measured. Since the difference between the weight in the air and the weight immediately after placement in the paraffin is considered to be the buoyancy of the paraffin, the apparent volume of the placed LSX particles including the voids can be calculated from the density of the paraffin. The density can be determined from the weight in the air and the apparent volume.

(3) The negative electrode material LSX in the form of a sintered body used in (2) and an amount of paraffin in which the negative electrode material LSX in the form of a sintered body was sufficiently immersed were placed in a separate container, and the container was stood still under a vacuum condition for one day.

(4) One day later, using the same method as in (2) again, the true volume of the negative electrode material LSX in the form of a sintered body was calculated from the weight, in the paraffin, of the negative electrode material LSX in the form of a sintered body with voids thereof filled with the paraffin was calculated, and the true density was calculated.

(5) The porosity in the sintered body was calculated using the mathematical expression:

$$[1-\{Apparent\ density\ in\ (2)/True\ density\ in\ (4)\}] \times 100.$$

As a result of confirming the coordinated state of elementary boron using an NMR apparatus, only elementary boron in a tetracoordinated state was detected, and elementary boron having a tricoordinated structure was not detected. Based on this, it is believed that the boron oxide has slightly reacted with the surface layer portion of the lithium silicate particles, and has formed a glassy oxide similar to a borosilicate glass.

The diffraction peaks mainly attributed to the simple substance of Si and $Li_2Si_2O_5$ were confirmed in the XRD pattern of the LSX particle A1, and the peak intensities were such that Si>$Li_2Si_2O_5$. As a result of measuring the LSX particle A1 by Si-NMR, the $SiO_2$ content was 7 mass % or less. The amount of the boron oxide (BOx) to the total amount of the lithium silicate phase, the silicon particles, and the boron oxide, calculated from the feeding ratio was 3 mass %.

[Fabrication of Negative Electrode]

The LSX particles A1 including a conductive layer and graphite were mixed at a mass ratio of 5:95, and the mixture was used as a negative electrode active material A1. The negative electrode active material A1, carboxymethyl cellulose sodium (CMC-Na), and styrene-butadiene rubber (SBR) were mixed at a mass ratio of 97.5:1:1.5, and water was added thereto. Thereafter, the mixture was stirred using a mixer (T.K. HIVIS MIX, manufactured by PRIMA Corporation), to prepare a negative electrode slurry. Next, the negative electrode slurry was applied to the surface of a copper foil such that the mass of the negative electrode material mixture per m$^2$ of the copper foil was 190 g, and the coating film was dried, followed by rolling, to fabricate a negative electrode in which a negative electrode material mixture layer having a density of 1.5 g/cm$^3$ was formed on both surfaces of the copper foil.

[Fabrication of Positive Electrode]

Lithium cobaltate, acetylene black, and polyvinylidene fluoride were mixed at a mass ratio of 95:2.5:2.5, and N-methyl-2-pyrrolidone (NMP) was added thereto. Thereafter, the mixture was stirred using a mixer (T.K.HIVIS MIX manufactured by PRIMIX Corporation), to prepare a positive electrode slurry. Next, the positive electrode slurry was applied to the surface of an aluminum foil, and the coating film was dried, followed by rolling, to fabricate a positive electrode in which a positive electrode material mixture layer having a density of 3.6 g/cm$^3$ was formed on both surfaces of the aluminum foil.

[Preparation of Non-Aqueous Electrolyte]

LiPF$_6$ was dissolved at a concentration of 1.0 mol/L in a solvent mixture including ethylene carbonate (EC) and diethyl carbonate (DEC) at a volume ratio of 3:7, to prepare a non-aqueous electrolyte.

[Fabrication of Non-Aqueous Electrolyte Secondary Battery]

A tab was attached to each of the electrodes, and the positive electrode and the negative electrode were spirally wound with a separator interposed therebetween such that the tabs were located at the outermost peripheral portion, to fabricate an electrode group. The electrode group was inserted into an outer case made of an aluminum laminate film, and the whole was vacuum dried at 105° C. for 2 hours. Thereafter, the non-aqueous electrolyte was injected into the outer case, and the opening of the outer case was sealed, to obtain a battery A1.

Comparative Example 1

A negative electrode material LSX B1 and LSX particles B1 were prepared in the same manner as in Example 1 except that B$_2$O$_3$ was not used in step (ii), and that the composite was directly fired in step (iii), and a battery B1 of Comparative Example 1 was fabricated using the LSX particles B1. As a result of measuring the porosity of the negative electrode material LSX B1 in the form of a sintered body before formation of the conductive layer, the porosity was 15.9%.

Figure 3:
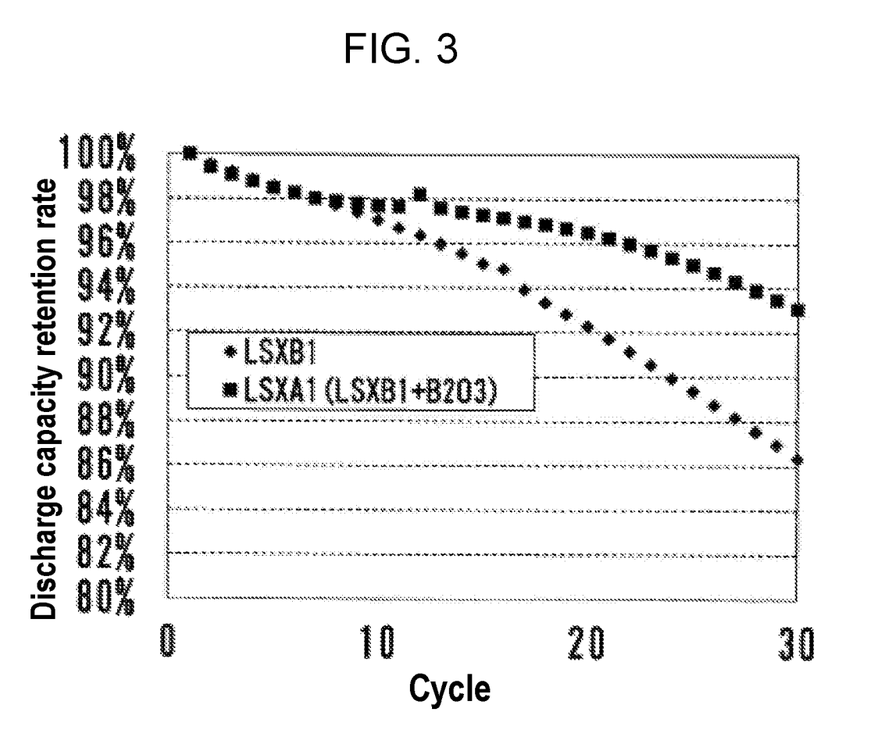
FIG. 3 is a graph showing the relationship between the number of charge/discharge cycles and the discharge capacity retention rate of the batteries of Example 1 and Comparative Example 1.

For the batteries of Example 1 and Comparative Example 1, charging/discharging was repeated under the following conditions. The rest period between charging and discharging was 10 minutes. The results are shown in FIG. 3.

[Initial Charging/Discharging Efficiency]

<Charging>

Constant current charging was performed with a current of 1 It (800 mA) until the voltage reached 4.2 V, followed by constant voltage charging with a constant voltage of 4.2 V until the current reached 1/20 It (40 mA).

<Discharging>

Constant current discharging was performed with a current of 1 It (800 mA) until the voltage reached 2.75 V.

From FIG. 3, it can be understood that the cycle characteristics are significantly improved by filling the low-melting point inorganic oxide in the voids of the lithium silicate phase. Since the porosity of the negative electrode material LSX was reduced by 0.7% by adding the boron oxide, it can also be understood that the boron oxide was filled in a portion of the voids of the particle agglomerate formed by the lithium silicate particles and the silicon particles, thus densifying the negative electrode material LSX.

INDUSTRIAL APPLICABILITY

With the negative electrode material LSX according to the present invention, it is possible to provide a non-aqueous electrolyte secondary battery having cycle characteristics. The non-aqueous electrolyte secondary battery according to the present invention is useful as a main power supply for mobile communication devices, mobile electronic devices, and the like.

REFERENCE SIGNS LIST

4. . . . Frame body
5. . . . Sealing plate
6. . . . Battery case
9. . . . Electrode group
11. . . . Negative electrode lead
13. . . . Negative electrode terminal
14. . . . Positive electrode lead
20. . . . LSX particle
21. . . . Lithium silicate phase
22. . . . Silicon particles
23. . . . Base particle
24. . . . Primary particles
25. . . . Low-melting point inorganic oxide
26. . . . Conductive layer

The invention claimed is:

1. A negative electrode material for a non-aqueous electrolyte secondary battery, comprising:
 a lithium silicate phase including lithium silicate particles;
 silicon particles dispersed in the lithium silicate phase; and
 a low-melting point inorganic oxide that has a lower melting point than lithium silicate forming the lithium silicate particles, and that is solid at room temperature,
 wherein the lithium silicate particles and the silicon particles form a particle agglomerate, and
 the low-melting point inorganic oxide is filled in at least a portion of voids included in the particle agglomerate.

2. The negative electrode material for a non-aqueous electrolyte secondary battery according to claim 1,
 wherein the low-melting point inorganic oxide is a glassy oxide.

3. The negative electrode material for a non-aqueous electrolyte secondary battery according to claim 1,
 wherein the low-melting point inorganic oxide includes at least one element selected from the group consisting of B and P.

4. The negative electrode material for a non-aqueous electrolyte secondary battery according to claim 3,
 wherein the low-melting point inorganic oxide includes at least B.

5. The negative electrode material for a non-aqueous electrolyte secondary battery according to claim 4,
 wherein 50 mol % or more of the B included in the low-melting point inorganic oxide is B having a tetra-coordinated structure.

6. The negative electrode material for a non-aqueous electrolyte secondary battery according to claim 1,
 wherein the particle agglomerate is a secondary particle in which a plurality of primary particles including the lithium silicate phase and the silicon particles dispersed in the lithium silicate phase are agglomerated, and the low-melting point inorganic oxide is present in at least a portion of an interface between the adjacent primary particles.

7. A non-aqueous electrolyte secondary battery comprising:
a negative electrode including the negative electrode material for a non-aqueous electrolyte secondary battery according to claim 1; a positive electrode capable of electrochemically absorbing and desorbing lithium; and a non-aqueous electrolyte.

* * * * *